United States Patent [19]

Rossler, Jr. et al.

[11] 4,216,930
[45] Aug. 12, 1980

[54] STRAIN RELIEF

[75] Inventors: Frederick W. Rossler, Jr., New Port Richey; Gerald M. Anderson, Clearwater, both of Fla.

[73] Assignee: AMP Incorporated, Harrisburg, Pa.

[21] Appl. No.: 936,444

[22] Filed: Aug. 24, 1978

[51] Int. Cl.² .............................................. F16L 5/00
[52] U.S. Cl. .................................. 248/56; 174/153 G; 339/103 B
[58] Field of Search ............. 174/153, 153 G; 248/56; 339/103 B

[56] References Cited

U.S. PATENT DOCUMENTS

| | | | |
|---|---|---|---|
| 2,291,430 | 7/1942 | Ingersoll | 174/154 |
| 2,974,186 | 3/1961 | Klumpp | 174/153 G |
| 3,056,852 | 10/1962 | Sachs | 174/153 G |
| 3,141,062 | 7/1964 | Rapata | 174/153 G |
| 3,243,206 | 3/1966 | Samer | 285/162 |
| 3,249,687 | 5/1966 | Klumpp | 174/153 G |
| 3,424,856 | 1/1969 | Coldren | 248/56 X |
| 3,493,205 | 2/1970 | Bromberg | 248/56 |
| 3,667,783 | 6/1972 | Sotolongo | 285/161 |
| 3,689,014 | 9/1972 | Fink | 248/56 |
| 3,744,008 | 7/1973 | Castellani | 339/103 B |
| 4,000,875 | 1/1977 | Jemison et al. | 248/56 |
| 4,077,085 | 3/1978 | Yuda | 174/153 G |

OTHER PUBLICATIONS

Weckesser Co. Inc., Bulletin No. 9401.

Primary Examiner—James C. Mitchell
Attorney, Agent, or Firm—F. Brice Faller

[57] ABSTRACT

A strain relief bushing having camming strain relief means for grasping a cord located therein. The strain relief bushing may be rotatably engaged and disengaged. It may be applied to existing cord, located in an aperture for later cord application or applied contemporaneously therewith.

12 Claims, 14 Drawing Figures

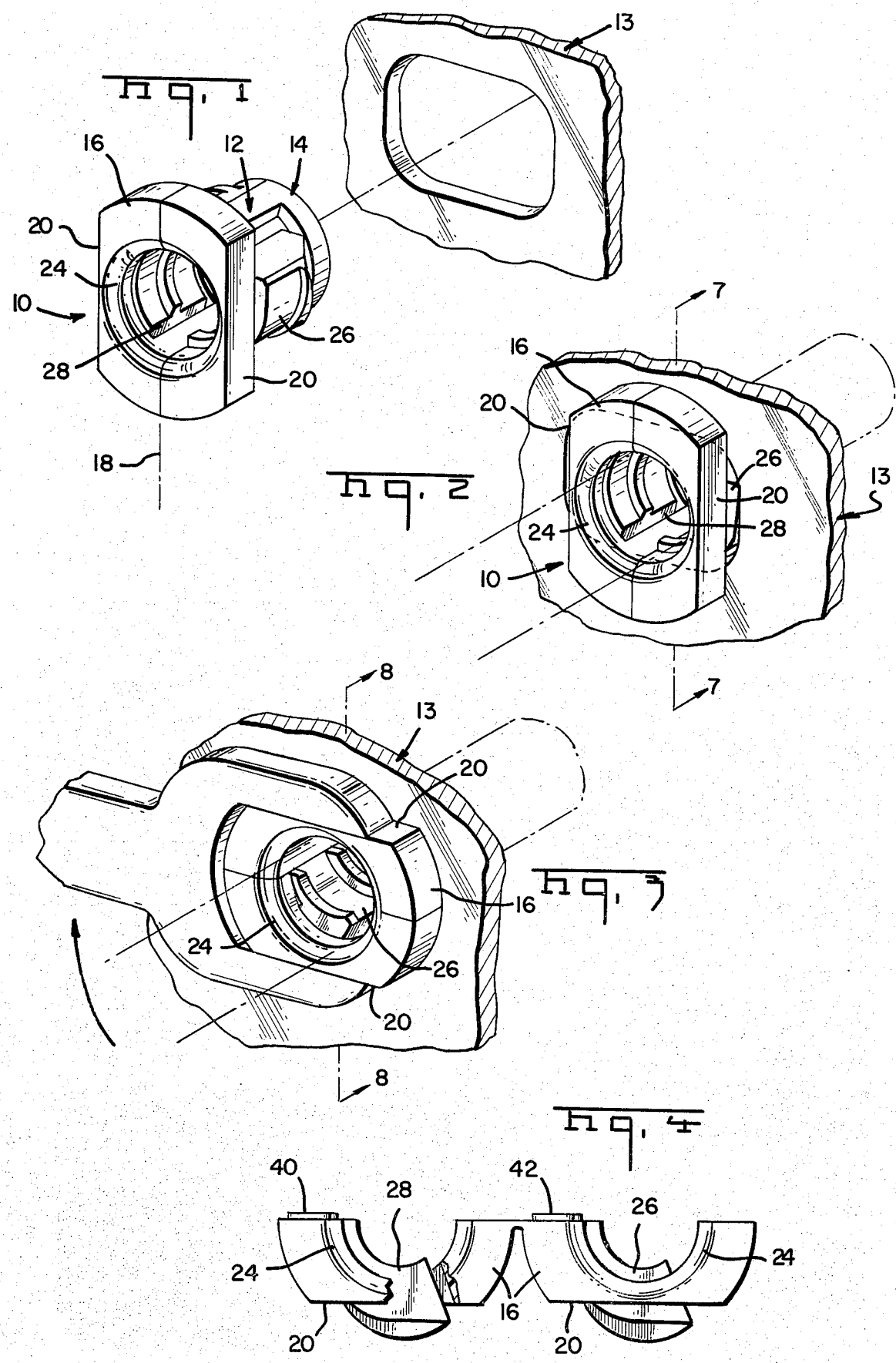

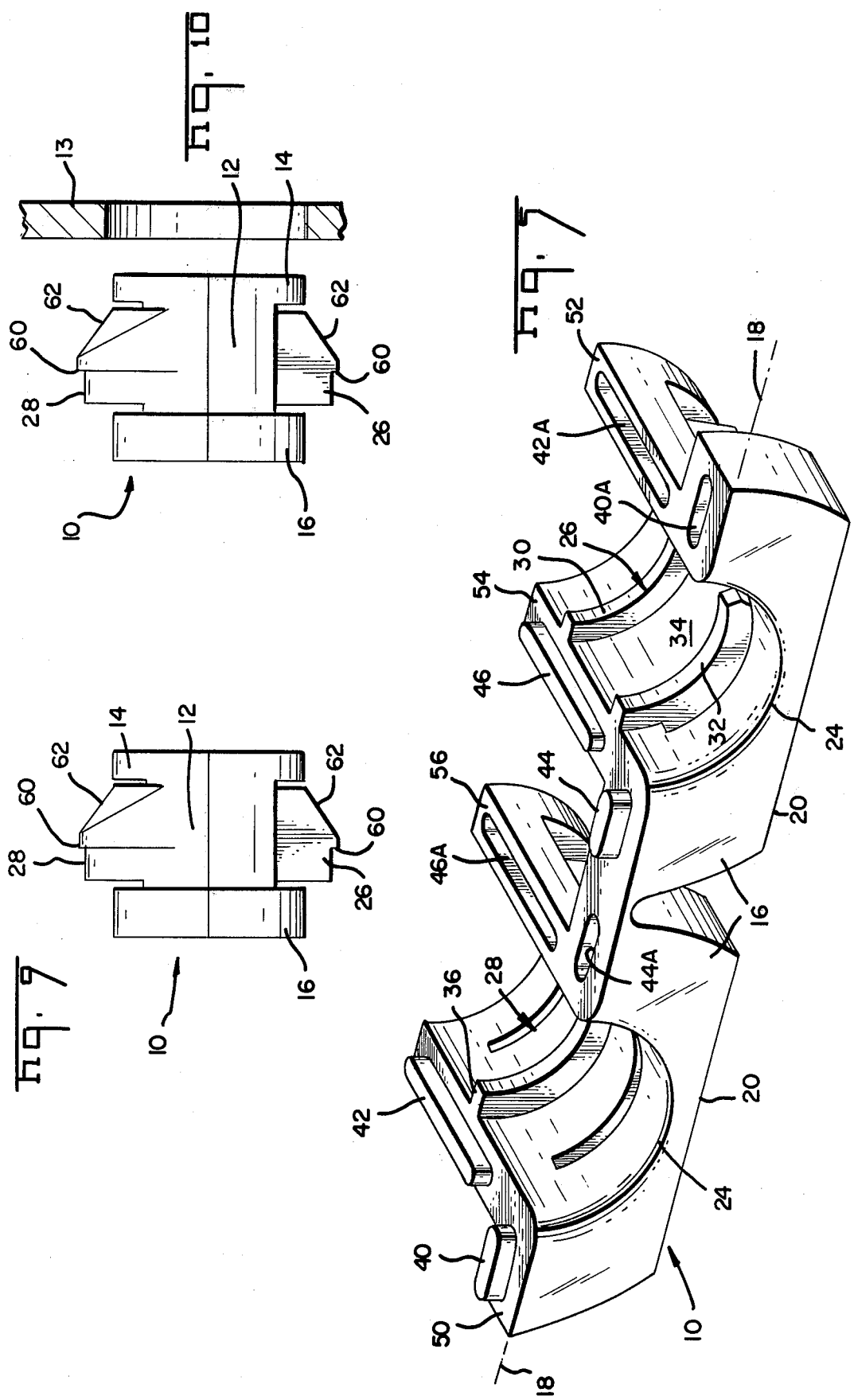

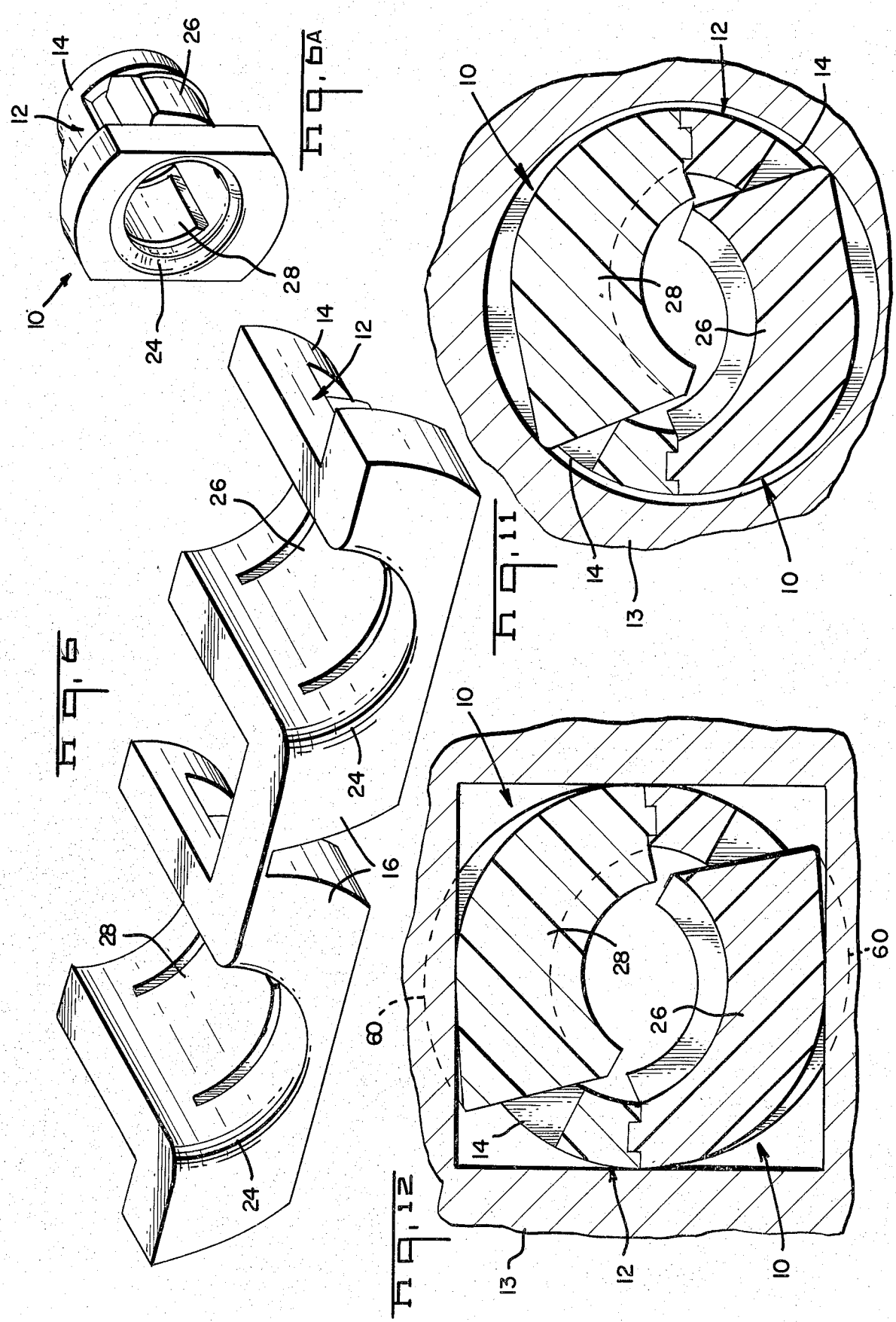

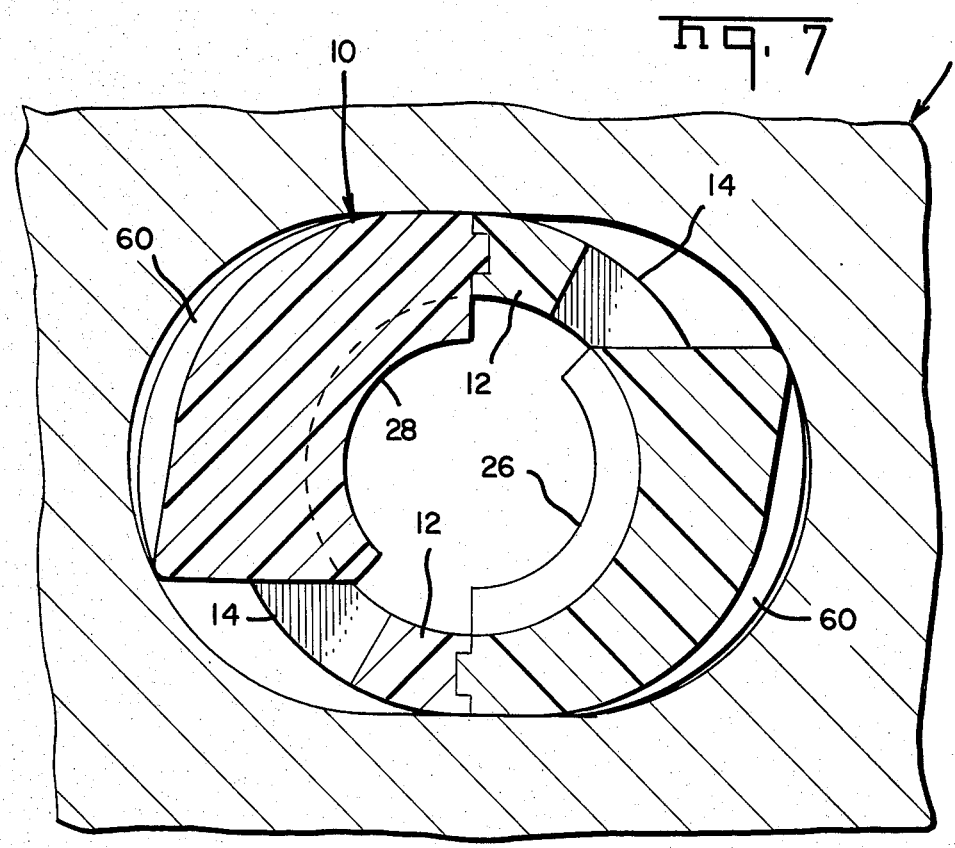
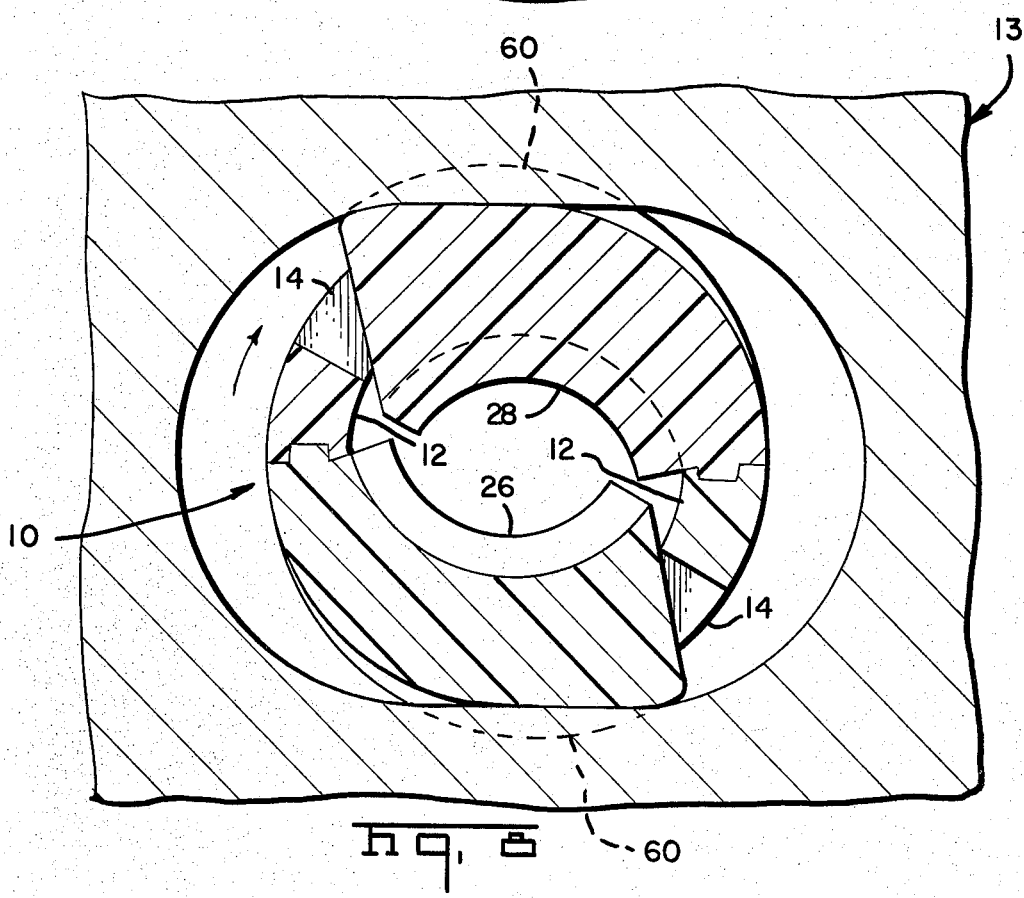

STRAIN RELIEF

BACKGROUND OF THE INVENTION

1. Field of the Invention

The present invention relates to a strain relief bushing for an electric cord or the like.

2. Description of the Prior Art

The prior art strain relief bushings fall into two broad general classes; (1) bushings which are secured by means by independent securing means or (2) bushings which are secured in place by interference fit. While the prior art has provided a number of devices capable of securing a cord in place, the prior art devices are generally more difficult to apply initially and more difficult to remove when cord replacement, repair, or removal is desired.

The present invention solves many of the prior art difficulties in that it may be easily applied without special tools to existing cord especially in its two part embodiment; it may be located in an aperture prior to cord insertion and then closed at a later time; it may be opened to permit cord access and then reused without any loss of effectiveness.

SUMMARY OF THE INVENTION

The present invention discloses a rotatable cam actuated strain relief bushing for securing a cord against strain. The invention is disclosed in a one-piece embodiment which has all the cam actuated advantages and in a spreadable embodiment which has the additional advantage of being easily usable on previously installed cord.

The strain relief bushing of the present invention is simply located as desired and then rotated 90° to cause opposing cantilever beams to be moved inward and grasp the cord.

BRIEF DESCRIPTION OF THE DRAWINGS

FIG. 1 is a three dimensional view of a strain relief embodying the principles of the present invention shown prior of insertion in a "Double D" shaped panel aperture.

FIG. 2 is a view similar to FIG. 1, but showing the strain relief in the panel prior to locking.

FIG. 3 is a view similar to FIGS. 1 and 2, but showing the strain relief rotated and locked in the panel (all wires have been omitted for clarity).

FIG. 4 is a front elevational view illustrating the strip form arrangement of the disclosed strain relief.

FIG. 5 is a three dimensional view of the spreadable strain relief in its fully open position.

FIG. 5A is a top view of FIG. 5.

Figure 7A:
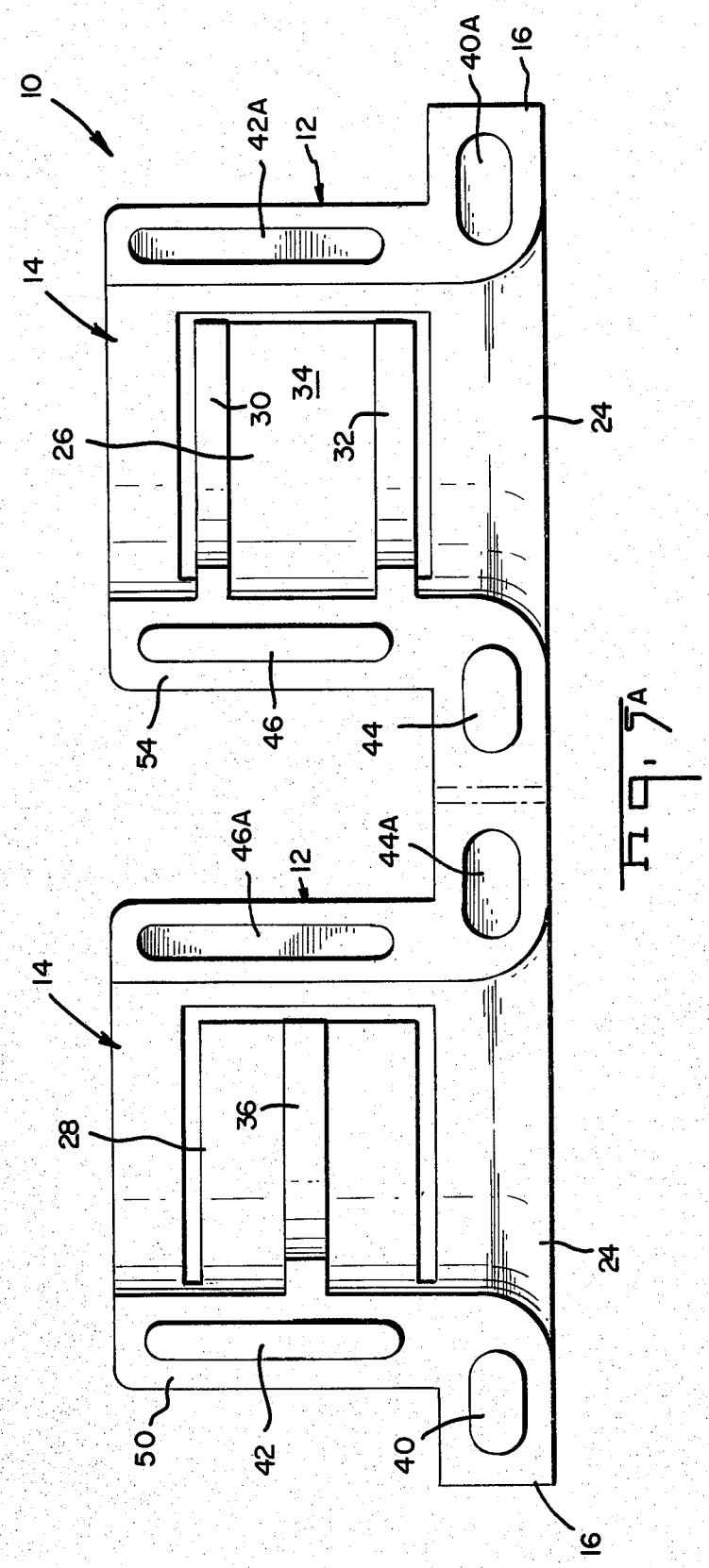

FG. 6 is a three dimensional view of the strain relief without internal surface protrusions.

FIG. 6A is the strain relief of FIG. 6 molded in one piece solid fashion.

FIG. 7 is a cross-section along the lines 7—7 of FIG. 2.

FIG. 8 is a cross-section along the lines 8—8 of FIG. 3.

FIG. 9 is a top view of the strain relief of FIG. 1.

FIG. 10 is a top view of the strain relief of FIG. 1 positioned to be received in the panel 13.

FIG. 11 is a sectional view of a strain relief in a circular aperture.

FIG. 12 is a sectional view of a strain relief in a square aperture.

DESCRIPTION OF THE PREFERRED EMBODIMENT

The presently preferred embodiment of the instant invention is set out in detail below.

FIG. 1 shows a strain relief 10, according to the principles of the present invention, prior to insertion in a double "D" aperture in a panel 13. Cylindrical body portion 12 of strain relief 10 terminates at one end thereof in a ring 14 which has an outside diameter less than the shorter diameter of the double "D" aperture. Cantilever members 26 and 28 of strain relief 10 are formed integral with cylindrical body portion 12 and have an outside diameter at the free end thereof which is less than the larger diameter of the double "D" aperture. Thus cylindrical body portion 12 is insertable through the double "D" aperture in panel 13 as shown in FIG. 2. FIG. 7, a section along the lines 7—7 of FIG. 2 clearly shows this orientation.

Referring again to FIG. 1, there is shown a shoulder portion 16 formed integrally with cylindrical portion 12 and sufficiently large to abut the panel 13 and restrict further linear travel through the aperture defined by the panel 13. The surfaces 20 of shoulder 16 have been adapted to permit easy application of a tool, i.e., a common wrench, as an aid in rotating strain relief 10 as shown in FIG. 3. A circular cavity extending throughout the length of strain relief 10 provides a cord passage. It is obvious that the passage dimensions may be varied for various size cords. In the preferred embodiment, countersink 24 has been provided at the lead in side of shoulder 16 to aid in wire insertion and to minimize damage due to rotation.

Cantilever members 26 and 28 at their dependent ends have an external surface of a radius equal to the radius of the external surface of body portion 12. Beginning at the dependent end thereof, the external surfaces of cantilever members 26 and 28 have increasing radii, the greatest of which defines an outer diameter less than the larger diameter of the double "D" aperture in panel 13. Panel 13 defining the aperture will serve as a cam surface and cantilever members 26 and 28 function as cam followers. The increase in radii may be of any amount sufficient to maintain camming surface contact with the panel 13 and provide the desired inward movement of cantilever members 26 and 28.

Referring now to FIGS. 7 and 8, it can be seen that as strain relief 10 is rotated the cantilever members 26 and 28 will be moved inwardly resulting in a reduced passage size in the area of cantilever members 26 and 28. This passage size reduction applies compressive force to a cord placed therein. While it is possible to practice the instant invention with smooth internal surfaced cantilever members, it has been found that some manner of protrusions from the surface of the cantilever members provide additional desirable results.

Referring now to FIGS. 4, 5, and 5A, there is shown strain relief 10 opened along centerline 18 of FIG. 1. Cantilever member 26 has two ribs 30 and 32 which extend from surface 54 to the free end thereof and border unobstructed surface 34. Cantilever member 28 has a single rib 36 which extends from surface 50 to the free end thereof and is located inward of the edges of cantilever member 28 so as to oppose unobstructed surface 34 when strain relief 10 is moved to the closed position. FIG. 5A is a top view of an opened strain relief 10 clearly showing the relationship of cantilever members 26 and 28 and ribs 30, 32, and 36.

Referring again to FIG. 5, there is shown a series of raised areas, 40 and 42 on surface 50; 44 and 46 on surface 54, which are adapted to mate with their respective recesses, 40A and 42A on surface 52; 44A and 46A on surface 56, when strain relief 10 is moved to the closed position. While not essential to the practice of the instant invention, this mating raised-recess pattern has been found to provide easy alinement and additional stability in the use of a spreadable strain relief constructed according to the instant invention.

FIG. 6 illustrates a strain relief, according to the present invention, without opposing ribs or a raised-recessed pattern.

FIG. 6A illustrates a closed embodiment of FIG. 6 which eliminates centerline 18. It is obvious that the strain relief of FIG. 6A could be made with internal protrusions on cantilever members 26 and 28 using molding techniques familiar to the art. However, at this time it is believed that the spreadable embodiment with ribs will be the most advantageous. Solid or closed molding with or without protrusions presents additional tooling problems which are easily overcome by the spreadable model. Additionally, the spreadable or open embodiment may be molded in strip form for easy handling and then simply severed in pairs to form a strain relief.

Referring now to FIG. 9, there is shown an additional feature of the preferred embodiment. Cantilever members 26 and 28 are formed with a ridge 60 which extends from the dependent end of the perspective cantilever member to the free end thereof. When strain relief 10 has been located in place, ridge 60 provides a positive stop against accidental withdraw of strain relief 10. This benefit can be seen by reference to FIG. 8.

While the present invention is particularly useful for application in a double "D" aperture, it is also useful in other applications. Referring now to FIG. 10, there is shown a strain relief 10 for use in pressure insertion applications. In this type of application, cantilever members 26 and 28 are moved inward by squeezing, such as with common pliers, about surfaces 20, so as to cause the lead edge inclined plane 62 to move inside the circumference defined by ring 14. As ring 14 is moved through the aperture in panel 13, inclined plane 62 will contact the panel 13 and in response to the insertion pressure further cam cantilever members 26 and 28 inward. When strain relief 10 has been inserted sufficiently, the ridge 60 on cantilever members 26 and 28 will clear panel 13 and lock behind it as a positive stop.

FIG. 11 illustrates strain relief 10 located in a circular aperture. Note that in this application strain relief 10 may be rotated 360° within the aperture, a feature which may occasionally be desired.

FIG. 12 illustrates strain relief 10 located in a square aperture. The method of application is as explained above for a circular aperture.

What is claimed is:

1. A cable strain relief for retaining a cable in an apertured panel comprising:
    a cylindrical body dimensioned to be received into said aperture and having a cable receiving passage extending therethrough,
    at least two opposite facing cantilever members integral with said cylindrical body and disposed immediate to said cable receiving passage, each of said cantilever members having an exterior surface which extends beyond the exterior surface of said cylindrical body, whereby said cantilever members upon contacting the panel defining said aperture are moved inwardly to reduce the dimension of said cable receiving passage.

2. The strain relief of claim 1 further comprising a shoulder portion integral with said cylindrical body, said shoulder portion having a cable receiving passage on the same centerline as the cylindrical body cable receiving passage, and dimensioned to abut said panel defining said aperture and prevent further linear travel.

3. The strain relief of claim 2 wherein said exterior surface of said cantilever members has a integral ridge dimensioned to abut said panel defining said aperture to prevent the withdraw of said strain relief.

4. The strain relief of claim 3 wherein the interior surfaces of said cantilever members have protrusions whereby upon inward movement of said cantilever members said protrusions further reduce the dimension of said cable receiving passage.

5. The strain relief of claim 1 wherein said exterior surface of said cantilever member has an integral ridge dimensioned to abut said panel defining said aperture to prevent the withdraw of said strain relief.

6. The strain relief of claim 5 wherein the interior surfaces of said cantilever members have protrusions whereby upon inward movement of said cantilever members said protrusions further reduce the dimension of said cable receiving passage.

7. A rotatable cable strain relief for mounting in an apertured panel comprising a body having a cylindrical portion dimensioned to be received into said aperture and a shoulder portion dimensioned to abut said panel, said body having a cable receiving passage extending therethrough, said cylindrical portion having opposite facing cantilever members disposed inward of said shoulder portion, each of said cantilever members having an external camming surface whereby upon rotation of said body in said aperture said external camming surface will engage said panel defining said aperture thereby moving said cantilever members inwardly to reduce the dimension of said receiving passage.

8. The strain relief of claim 7 wherein the internal surfaces of said cantilever members have complementary ridges.

9. A cable strain relief comprising two body halves, each of said body halves generally being of a half-cylinder configuration and having an integral cantilever member dependent from a linial side thereof, and the free end of said cantilever member extending inwardly in circumferential alignment with said body half, said cantilever member having an exterior surface extending beyond the exterior surface of said body half, whereby said body halves are assembled to define a cylindrical body having a cable receiving passage therethrough and said cantilever members disposed immediate to and on opposite sides of said cable receiving passage.

10. A cable strain relief comprising:
    a cylindrical body, said cylindrical body having a cable receiving passage therethrough and at least one cantilever member integral with said body and disposed immediate to said receiving passage,
    said cantilever member having a base aligned circumferentially with said cylindrical body and an exterior surface having a first portion increasing radially outward as it progresses the length from said base to the free end thereof and a second arcuately-shaped portion having a first edge beginning at said base and extending along the length of said cantilever member in circumferential alignment with said cylindrical body and a second edge diverging from said base with increasing radii as it extends along the length of said cantilever member such that the furthermost point on said arcuate surface lies in the circumference of an imaginary circle having a greater radius than said cylindrical body.

11. A cable strain relief comprising:

a cylindrical body, said cylindrical body having a cable receiving passage therethrough and at least one cantilever member integral with said cylindrical body and disposed immediate to said cable receiving passage, said cantilever member having a base aligned circumferentially with said cylindrical body and an exterior arcuate surface having a first edge beginning at said base and extending along the length of said cantilever member in circumferential alignment with said cylindrical body and a second edge diverging from said base with increasing radii as it extends along the length of said cantilever member such that the furthermost point on said arcuate surface lies in the circumference of an imaginary circle having a greater radius than said cylindrical body.

12. A rotatable strain relief for retaining a cable in an enlongate aperture in a panel comprising:

a cylindrical body having a diameter less than the minor diameter of said elongate aperture, a cable receiving passage therethrough and at least one cantilever member integral with said cylindrical body and disposed immediate to said cable receiving passage, said cantilever member having a base aligned circumferentially with said cylindrical body and an exterior surface which increases radially outward as it progresses the length from said base to said free end such that the furthermost point on said exterior surface lies in the circumference of an imaginary circle having a diameter larger than said cylindrical body and less than the major diameter of said elongate aperture, whereby said strain relief is positioned in said elongate aperture with said cantilever member axially aligned with said major diameter, said strain relief is then rotated to bring said exterior surface of said cantilever member into contact with said elongate aperture and toward said minor diameter thereby causing said cantilever member to move into said cable receiving passage.

* * * * *

UNITED STATES PATENT OFFICE
CERTIFICATE OF CORRECTION

Patent No. 4,216,930　　　　　Dated August 12, 1980

Inventor(s) Frederick W. Rossler, Jr. & Gerald M. Anderson

It is certified that error appears in the above-identified patent and that said Letters Patent are hereby corrected as shown below:

Column 4, line 13, "members" should read --member--.

Column 4, line 41, "members" should read --member--.

*Signed and Sealed this*

*Fourth* Day of *November 1980*

[SEAL]

*Attest:*

SIDNEY A. DIAMOND

*Attesting Officer*　　*Commissioner of Patents and Trademarks*